US009150779B2

(12) United States Patent
Anderson et al.

(10) Patent No.: US 9,150,779 B2
(45) Date of Patent: Oct. 6, 2015

(54) WELL TREATMENT FLUID COMPOSITIONS AND METHODS OF USE THAT INCLUDE A DELAYED RELEASE PERCARBONATE FORMULATION (71) Applicant: Kemira Chemicals Inc., Kennesaw, GA (US)

(72) Inventors: Carolina Hanna Matilda Anderson, Angelholm (SE); Mona Ezzelarab, Lund (SE); Cecilla Eva Maria Johansson, Helsingborg (SE); Carl Wilhelm Aften, Marietta, GA (US); Walter Philip Watson, Kennesaw, GA (US); Richard Anthony Lalama, Canton, GA (US); Geoffrey Allen Monteith, Midland, GA (US); Frank Schinkel, Hamburg (DE)

(73) Assignee: Kemira Chemicals Inc., Kennesaw, GA (US)

(*) Notice: Subject to any disclaimer, the term of this patent is extended or adjusted under 35 U.S.C. 154(b) by 0 days.

(21) Appl. No.: 13/773,764

(22) Filed: Feb. 22, 2013

(65) Prior Publication Data
US 2013/0165352 A1 Jun. 27, 2013

Related U.S. Application Data (63) Continuation of application No. 12/251,479, filed on Oct. 15, 2008, now Pat. No. 8,501,670.

(60) Provisional application No. 60/979,975, filed on Oct. 15, 2007.

(51) Int. Cl.
C09K 8/80 (2006.01)
C09K 8/68 (2006.01)
C01B 15/10 (2006.01)
C09K 8/70 (2006.01)
C09K 8/92 (2006.01)
C02F 1/72 (2006.01)
C02F 103/10 (2006.01)

(52) U.S. Cl.
CPC ............... *C09K 8/685* (2013.01); *C01B 15/103* (2013.01); *C01B 15/106* (2013.01); *C09K 8/68* (2013.01); *C09K 8/706* (2013.01); *C09K 8/80* (2013.01); *C09K 8/92* (2013.01); *C02F 1/722* (2013.01); *C02F 2103/10* (2013.01); *C02F 2209/09* (2013.01); *C02F 2305/14* (2013.01); *C09K 2208/26* (2013.01); *Y10T 428/2991* (2015.01); *Y10T 428/2993* (2015.01)

(58) Field of Classification Search
None
See application file for complete search history.

(56) References Cited

U.S. PATENT DOCUMENTS 4,107,057 A 8/1978 Dill et al.
5,164,099 A 11/1992 Gupta et al.
(Continued)

FOREIGN PATENT DOCUMENTS

EP 0634478 7/1993
EP 0623553 7/1997
(Continued)

Primary Examiner — Alicia Bland
(74) Attorney, Agent, or Firm — King & Spalding (57) ABSTRACT A well treatment fluid and method of use includes water, at least one hydratable polymer, an optional crosslinking agent, and a delayed release percarbonate formulation effective to reduce initial viscosity of the fluid after a period of time. Also disclosed are processes for fracturing a subterranean formation.

8 Claims, 6 Drawing Sheets (56) References Cited

U.S. PATENT DOCUMENTS

| | | | | |
|---|---|---|---|---|
| 5,373,901 | A * | 12/1994 | Norman et al. | 166/300 |
| 5,624,886 | A | 4/1997 | Dawson et al. | |
| 6,380,146 | B1 | 4/2002 | Breel et al. | |
| 6,983,801 | B2 | 1/2006 | Dawson et al. | |
| 2003/0013631 | A1 | 1/2003 | Goldoni et al. | |
| 2003/0104967 | A1 | 6/2003 | Jakob et al. | |
| 2003/0203475 | A1 | 10/2003 | Davis-Hoover et al. | |
| 2006/0116296 | A1 * | 6/2006 | Kippie et al. | 507/244 |
| 2006/0264334 | A1 | 11/2006 | Gupta et al. | |
| 2007/0181510 | A1 | 8/2007 | Harvey et al. | |
| 2007/0204997 | A1 * | 9/2007 | Harris et al. | 166/311 |

FOREIGN PATENT DOCUMENTS

| | | |
|---|---|---|
| EP | 0789748 | 4/2000 |
| EP | 0992575 | 4/2000 |
| EP | 1149800 | 4/2007 |
| GB | 1538893 | 5/1976 |
| GB | 2426973 | 4/2006 |
| JP | 11158016 | 6/1999 |
| WO | WO 00/57022 | 9/2000 |
| WO | WO 0142411 | 6/2001 |
| WO | WO 2006/114651 | 11/2006 |

* cited by examiner

WELL TREATMENT FLUID COMPOSITIONS AND METHODS OF USE THAT INCLUDE A DELAYED RELEASE PERCARBONATE FORMULATION

CROSS REFERENCE TO RELATED APPLICATIONS

This application is a continuation of U.S. patent application Ser. No. 12/251,479 filed Oct. 15, 2008, which claims the benefits of the legally related U.S. provisional Patent Application Ser. No. 60/979,975 filed Oct. 15, 2007. The complete disclosure of each above-identified application is fully incorporated herein by reference.

BACKGROUND

The present disclosure generally relates to well treatment fluid compositions and methods of use, and more particularly, to well treatment fluids and methods that include a delayed release percarbonate formulation.

The internal pressure in an oil well forces only about the first 3 percent to the surface and 10-20% can be acquired by traditional pumping. Gaining access to at least part of the remaining oil requires more advanced technology. In order to gain access, viscous well treatment fluids are commonly used in the drilling, completion, and treatment of subterranean formations penetrated by wellbores. For example, hydraulic fracturing is often practiced as a means to enhance recovery. During hydraulic fracturing, a viscous well treatment fluid is injected into a well bore under high pressure. Once the natural reservoir pressures are exceeded, the fracturing fluid initiates a fracture in the formation that generally continues to grow during pumping. As the fracture widens to a suitable width during the course of the treatment, a proppant (e.g., sand grains, aluminum pellets, or other material), may then also be added to the fluid. The proppant remains in the produced fracture to prevent closure of the fracture and to form a conductive channel extending from the well bore into the formation being treated once the fracturing fluid is recovered. The treatment design generally requires the well treatment fluid to reach a maximum viscosity as it enters the fracture that affects the fracture length and width. The viscosity of most fracturing fluids is generated from water-soluble polysaccharides, such as galactomannans or derivatives thereof. Crosslinking agents, such as borate, titanate, or zirconium ions, are commonly added to increase the fluid viscosity.

Once a suitable amount of fractures are formed, it is generally desirable that the fluid viscosity decrease to levels approaching that of water after the proppant is placed. This allows a portion of the treating fluid to be recovered without producing excessive amounts of proppant after the well is opened and returned to production. The recovery of the fracturing fluid is accomplished by reducing the viscosity of the fluid to a lower value such that it flows naturally from the formation. Incorporating chemical agents, referred to as breakers or breaking agents, into the fluid can accomplish this viscosity reduction or conversion. Typically, these agents are either oxidants or enzymes that operate to degrade the polymeric gel structure.

Treatment fluids are also utilized in sand control treatments, such as gravel packing. In gravel-packing treatments, a treatment fluid suspends particulates (commonly referred to as "gravel particulates") for delivery to a desired area in a well bore, e.g., near unconsolidated or weakly-consolidated formation zones, to form a gravel pack to enhance sand control.

One common type of gravel-packing operation involves placing a sand control screen in the well bore and packing the annulus between the screen and the well bore with the gravel particulates of a specific size to prevent the passage of formation sand. The gravel particulates act to prevent the formation particulates from occluding the screen or migrating with the produced hydrocarbons, and the screen acts to prevent the particulates from entering the production tubing. Once the gravel pack is substantially in place, the viscosity of the treatment fluid may be reduced to allow it to be recovered. In some situations, fracturing and gravel-packing treatments are combined into a single treatment (commonly referred to as "frac pack" operations). In such "frac pack" operations, the treatments are generally completed with a gravel pack screen assembly in place with the hydraulic fracturing treatment being pumped through the annular space between the casing and screen. In this situation, the hydraulic fracturing treatment may end in a tip screen-out condition. In other cases, the fracturing treatment may be performed prior to installing the screen and placing a gravel pack.

Maintaining sufficient viscosity in these treatment fluids is important for a number of reasons. Maintaining sufficient viscosity is important in fracturing and sand control treatments for particulate transport and/or to create or enhance fracture width. Also, maintaining sufficient viscosity may be important to control and/or reduce fluid-loss into the formation. Moreover, a treatment fluid of a sufficient viscosity may be used to divert the flow of fluids present within a subterranean formation (e.g., formation fluids, other treatment fluids) to other portions of the formation, for example, by "plugging" an open space within the formation. At the same time, while maintaining sufficient viscosity of the treatment fluid often is desirable, it also may be desirable to maintain the viscosity of the treatment fluid in such a way that the viscosity may be reduced at a particular time for subsequent recovery of the fluid from the formation. Additionally, the viscosity also may help determine the open fracture width.

In choosing a suitable breaker, one may consider the onset of the viscosity reduction, i.e., breakage. Viscous well treatment fluids that break prematurely can cause suspended proppant material to settle out before being introduced a sufficient distance into the produced fracture. Moreover, premature breaking can result in a less than desirable fracture width in the formation causing excessive injection pressures and premature termination of the treatment.

On the other hand, viscous well treatment fluids that break too slowly can cause slow recovery of the fracturing fluid from the produced fracture, which delays hydrocarbon production. Still further, the proppant can dislodge from the fracture, resulting in at least partial closing and decreased efficiency of the fracturing operation. Preferably, the fracturing gel should begin to break when the pumping operations are concluded. For practical purposes, the gel preferably should be completely broken within about 24 hours after completion of the fracturing treatment.

In low-temperature wells, enzymatic breaking agents are often used, but they are relatively expensive in comparison to oxizidizing breaking agents. In shallow wells, percarbonates are often used, but as the drilling gets deeper percarbonates provide premature breaking and are less preferred.

Accordingly, there is a need in the art for improved breaking agents that can be used in various settings, depths, conditions, and oil well applications.

BRIEF SUMMARY

Disclosed herein are well treatment compositions and processes for use. In one embodiment, a well treatment fluid comprises water; at least one hydratable polymer; and sodium percarbonate granules having a delayed release coating, wherein the delayed release coating is an inorganic material.

In another embodiment, the well treatment fluid comprises water; at least one hydratable polymer; and sodium percarbonate granules having a delayed release coating, wherein the delayed release coating comprises a mixture of styrene acrylate and butyl acrylate In another embodiment, a process for fracturing a subterranean formation comprises injecting under pressure an aqueous hydraulic fluid having a first viscosity into a well bore, wherein the aqueous hydraulic fluid comprises water; at least one at least one hydratable polymer; and sodium percarbonate granules having a delayed release coating of an inorganic material; forming fractures in the subterranean formation with the hydraulic fluid at the first viscosity and dissolving the delayed release coating to expose the sodium percarbonate to the water after a period of time; reacting the sodium percarbonate with the at least one hydratable polymer to decrease the first viscosity to a second viscosity; and recovering at least a portion of the hydraulic fluid having the second viscosity.

The disclosure may be understood more readily by reference to the following detailed description of the various features of the disclosure and the examples included therein.

BRIEF DESCRIPTION OF THE DRAWINGS

Referring now to the figures wherein the like elements are numbered alike.

DETAILED DESCRIPTION

The present disclosure is generally directed to well treatment fluids containing a delayed release sodium percarbonate formulation for use in oil field applications. As used herein, the term "delayed release" refers to a dissolution profile that retards the release of oxidizing agent into the well treatment fluid. For example, the delayed release coatings of the sodium percarbonate granules could provide dissolution times of on the order of a few minutes up to about 5 hours at neutral pHs (i.e., pHs at about 6 to about 8) depending on the intended application. The delayed release sodium percarbonate can be used in the drilling, completion, treatment of subterranean formations penetrated by wellbores, and the like, at operating temperatures of 0° F. to about 400° F.

The well treatment fluid is an aqueous fluid comprising at least one hydratable polymer, an optional crosslinking agent, and the delayed release sodium percarbonate formulation. In addition, an optional proppant can be added to the fluid depending on the intended oil field application. During operating, the fluid is pumped into a subterranean formation at a first viscosity and then allowed to break (i.e., effect a reduction in viscosity) as the dissolution of the delayed release coating thereabout the sodium percarbonate granule. The well treatment fluid with the reduced viscosity may then be recovered as may be desired. The intended end use will dictate the viscosities needed for the fluid, e.g., gel pigs may require a higher viscosity whereas a fracturing fluid may require a relatively lower viscosity.

The aqueous base used in the well treatment fluids are not intended to be limited and may include water, salt water, brine, sea water, and the like. Generally, the water can be from any source, treated or untreated, provided it does not contain components that may affect the stability of any of the other components in the well treatment fluid. The pH of the aqueous fluid can be adjusted to render the fluid compatible with the crosslinking agent. In one embodiment, a pH adjusting material is added to the aqueous fluid after the addition of the water-soluble polymer to the aqueous fluid. Typical materials for adjusting the pH are bases, acids, and buffers. For example, sodium bicarbonate, potassium carbonate, sodium hydroxide, potassium hydroxide, and sodium carbonate are typical pH adjusting agents. In one embodiment, pH values for the fluid may range from about 5 to about 14. In other embodiments, the pH is from about 7 to about 14, and in still other embodiments, the pH is between about 8 to about 12.

Suitable hydratable polymers include those that are capable of forming a gel in the presence of a crosslinking agent. Suitable hydratable polysaccharides include, but are not limited to, galactomannan gums, guars, derived guars, xanthan, diutan, scleroglucan, and derivatives thereof. Specific examples are guar gum, guar gum derivatives, locust bean gum, Karaya gum, and the like. Suitable hydratable polymers may also include synthetic polymers, such as polyvinyl alcohol, polyacrylamides, poly-2-amino-2-methyl propane sulfonic acid, and various other synthetic polymers and copolymers. Other suitable polymers are known to those skilled in the art. Mixtures of polymers are also contemplated.

The amount of hydratable polymer in the fluid is not intended to be limited. Generally, the hydratable polymer may be present in the fluid at concentrations ranging from about 0.10% to about 5.0% by weight of the aqueous fluid. A preferred range for the hydratable polymer is about 0.20% to about 0.80% by weight.

A suitable crosslinking agent can be any compound that increases the viscosity of the fluid by chemical crosslinking, physical crosslinking, or any other mechanisms. As used herein, the term crosslinking generally refers to the formation of a bond between two molecules. For example, suitable crosslinking agents include borates such as boric acid, sodium metaborate, sodium tetraborate and the like; titanites such as titanium chelate esters; dialdehydes; zirconium containing compounds; zinc; various mixtures thereof; and the like. Other suitable crosslinking agents will be well within the skill of those in the art. The selection of an appropriate crosslinking agent generally depends upon the type of treatment to be performed and the hydratable polymer to be used. The amount of the crosslinking agent used also depends upon the well conditions and the type of treatment to be effected, but is generally in the range of from about 10 parts per million (ppm) to about 1000 ppm of metal ion of the crosslinking agent in the hydratable polymer fluid. In some applications, the aqueous polymer solution is crosslinked immediately upon addition of the crosslinking agent to form a highly viscous gel. In other applications, the reaction of the crosslinking agent can be retarded so that viscous gel formation does not occur until the desired time.

The hydratable polymer, independently or in combination with the crosslinking agent, is present in the fluid at concentrations effective to provide a first viscosity greater than 1,000 cP at 3.77 sec$^{-1}$.

The delayed release sodium percarbonate formulation is formed from sodium percarbonate granules. In the present disclosure, the granules are substantially spherical particles with a typical size distribution in the range of 0.3 to 1.5 millimeters (mm) with a core of sodium percarbonate ($Na_2CO_3$:$1.5H_2O_2$) and a delayed release coating. Mesh screens can be used to isolate particular sizes as may be desired for different applications. The sodium percarbonate granules can be coated with an inorganic material or a polymeric material depending on the intended application. Suitable inorganic materials include alkali metal and/or alkaline earth metal silicates. Optionally, the sodium percarbonate granules may first be coated with sulfate salt, e.g., sodium sulfate, magnesium sulfate, and the like. The coating themselves are preferably uniform and homogenous about the sodium percarbonate granules. The function of the coating layer is to protect the sodium percarbonate from contact with humidity and/or water present in the environment, which enhances the decomposition of the core material.

In one embodiment, the inorganic material is an alkali metal silicate. coated at an amount of 15 to 37 wt. % relative to the sodium percarbonate granules, and in still other embodiments, at 22 to 37 wt. %. It has been found that at amounts less than 15 wt. %, the delay in percarbonate dissolution in a well treatment fluid is minimal at temperatures up to 150° F. A similar result is observed at a silicate wt. % less of than 22 at temperatures of 150 to 180° F. At amounts greater than 37 wt. %, the particles tend to agglomerate and form clusters. Once the clusters are formed, the coating has a tendency to break asymmetrically during well treatment, thereby prematurely exposing the hydratable polymer to sodium percarbonate leading to oxidative degradation of the polymer and a reduction in viscosity. Because of this, the dissolution profile is very difficult to predict and oftentimes irregular. An exemplary alkali metal silicate is sodium ($Na_2SiO_3$).

Suitable polymers for providing the delayed release coating include polystyrenes, polyacrylates, polysiloxanes, and mixtures thereof.

Coating the sodium percarbonate granules generally includes spraying the sodium percarbonate granules with the desired coating material in a fluidized bed. A typical silicate based coating would be performed with an ingoing airflow of 120 to 155 cubic meters per hour ($m^3/h$) at a temperature of 110 to 135° C. By way of example, a percarbonate bed of 2 to 3 kilograms (kg) at a temperature of 80 to 105° C. was sprayed at a rate of 0.5 to 2.5 kilograms per hour (kg/h) with a solution of the coating diluted to about 30 to about 40% by weight. Typical polymer coatings can be performed with an ingoing airflow of 125 to 140 $m^3/h$ at a temperature of 0 to 70° C. By way of example, a percarbonate bed of about 3 kg at a temperature of 19 to 55° C. was sprayed with a polymer solution at a rate of 0.2 to 0.7 kg/h. Coating of the sodium percarbonate granules can be performed in a AGT 150 fluidized bed system commercially available from Glatt (Germany).

The internal stability of sodium percarbonate granules can be followed by analyzing the active oxygen content at intervals by measuring the TAM (Thermal Activity Monitoring) value, wherein the stability increases with decreasing TAM value. A good storage life is indicated by a low TAM value. For some applications, the TAM value should preferably be below about 15 µW/g and in particular below about 10 µW/g for sodium percarbonate. The TAM value is a microcalorimetric analysis of the energy released during storage, measured by means of the TAM® Thermal Activity Monitor from Thermometric AB (Sweden). As the sodium percarbonate degrades, it gives off heat. The flow of this heat is measured as a TAM value in µW/g.

Well stimulation and completion (treatment) fluid compositions of the present disclosure can further comprise other additives. Additives are generally included to enhance the stability of the fluid composition itself to prevent breakdown caused by exposure to oxygen, temperature change, trace metals, constituents of water added to the fluid composition, to prevent non-optimal cross linking reaction kinetics, to protect oilfield equipment, and to prevent the growth of bacteria. The choice of components used in fluid compositions is dictated to a large extent by the properties of the hydrocarbon-bearing formation on which they are to be used. Such additives can be selected from the group including oils, salts (including organic salts), biocides, corrosion inhibitors and dissolvers, pH modifiers (e.g., acids and bases), metal chelators, metal complexors, antioxidants, wetting agents, polymer stabilizers, clay stabilizers, scale inhibitors and dissolvers, wax inhibitors and dissolvers, asphaltene precipitation inhibitors, water flow inhibitors, fluid loss additives, chemical grouts, diverters, sand consolidation chemicals, proppants, permeability modifiers, viscoelastic fluids, gases (e.g., nitrogen and carbon dioxide), foaming agents, and the like.

The following examples are presented for illustrative purposes only, and are not intended to limit the scope of the invention.

EXAMPLES

In the following examples, sodium percarbonate was commercially obtained from Kemira Kemi AB under the tradename Ecox. Sodium silicate was commercially obtained at a molar ratio of 3.3±0.2 from Askania (Sweden). Styrene acrylate polymer and butyl acrylate/styrene polymer was obtained from commercial paint manufacturer Beckers (Sweden).

Stability was determined by analyzing the active oxygen content of a freshly prepared sample and comparing it with active oxygen content after 2 months. The active oxygen or hydrogen peroxide content was determined by titration with potassium permanganate (0.2 N) in acidic solution (10% sulphuric acid). A sample of 5 grams (g) was dissolved in 75 milliliters (ml) of 10% $H_2SO_4$ solution. Of this sample, 3 g of the solution was titrated with $KMnO_4$ solution using a combined Pt-electrode; a Metrohm 794 Basic Titrino and Metrohm 665 Dosimat.

Dissolution time was analyzed by conductivity, measured with a Cond 340i, WTW on 2 g sample in 1 liter (L) of deionized water at 20° C. The sample was stirred at approximately 750 revolutions per minute (rpm) throughout the measurement. The rate of dissolution is given graphically as the time (in minutes) at which 90% of maximum conductivity was obtained.

Example 1

In this example, sodium percarbonate granules were coated with different types of coating materials at various thicknesses. Dissolution time and stability were measured. Stability was measured as the active oxygen content (AO) over a 2 month period of time. The results are provided in Table 1.

The active oxygen values provided means for comparing the relative stability between samples. The 24-hour value is a standard uncoated sodium percarbonate reference value as the uncoated sodium percarbonate granules typically reach a stable value after this period of time.

TABLE 1

| Sample # | Coating Calculated coating (analyzed %) | Dissolution (min) | Initial AO % | AO 2 month % |
|---|---|---|---|---|
| Control | Uncoated (ref) | 68 (sec) | 32 | — |
| Control | Uncoated (ref) | 51 (sec) | 31 | — |
| 1 | Na$_2$SiO$_3$ 10% | 33 | 28 | 28 |
| 2 | Na$_2$SiO$_3$ 30% | 180 | 21 | 21 |
| 3 | Styrene acrylate 0.9% | 23 | 31 | 30 |
| 4 | Styrene acrylate 1.7% | 68 | 30 | 30 |
| 5 | Butyl acrylate 8% | 12 | 28 | 26 |
| 6 | Butyl acrylate 30% | 26 | 21 | 21 |
| 7 | Styrene acrylate 2% + butyl acrylate 3% | 175 | 30 | 30 |

The dissolution time units for the controls were seconds. The results indicate that dissolution time of sodium percarbonate is extended by applying a coating of a polymeric material or an inorganic material. As a single coating, the silicate-coated sodium percarbonate granules exhibited a very good effect on dissolution time at room temperature and also gave a very stable product. Although the coatings with one type of polymer, butyl acrylate, were generally less effective, the combination of polymers seemed to have a synergistic effect and was very efficient even with rather thin coatings. The polymer coatings appeared to have a positive effect on the stability as well.

Example 2

In this example, coating stability of sodium silicate-coated sodium percarbonate and its degradation capability of guar was analyzed during for an oil well pumping simulation. In a 2-L vessel, 1000.0 g of deionized water was added to 10.0 g of an anionic carboxymethyl hydroxypropyl guar commercially obtained from Hercules, Incorporated under the tradename Aqualon Galactasol 651 and stirred for about 30 min at 3000 rpm to form a stock solution. To 175.0 g of the stock solution, 0.8 g of a titanium based crosslinker commercially available from E.I. du Pont de Nemours and Company under the tradename Tyzor® 131 was added, stirred at 1500 rpm for about 2 minutes and allowed to gel for about 30 minutes. Using a Grace M3500A rotary viscometer equipped with an R1 rotor and a B2 bob, the gel was presheared at 75.4 s$^{-1}$ at a predefined temperature for 30 min and then sheared for 30 s at 3.77 s$^{-1}$ to measure the initial gel viscosity. Next, a predefined amount of breaker was added, and the gel was sheared at 75.4 s$^{-1}$ for 60 minutes, with 30-second breaks at 3.77 s$^{-1}$ to measure the viscosity after 1, 3, 5, 7, 10, 15, 20, 25, 30, 35, 40, 45, 50, 55, and 60 minutes. The parameters for each test are provided in Table 2.

TABLE 2

| | BREAKER CONCENTRATION (wt % sodium percarbonate actives) | TEMP. (° F.) | Na$_2$SiO$_3$ (wt %) |
|---|---|---|---|
| 1 | 0.05 | 75 | Uncoated |
| 2 | 0.5 | 75 | Uncoated |
| 3 | 0.275 | 133 | Uncoated |
| 4 | 0.05 | 190 | Uncoated |
| 5 | 0.5 | 190 | Uncoated |
| 6 | 0.275 | 75 | 10 |
| 7 | 0.05 | 75 | 30 |
| 8 | 0.5 | 75 | 30 |
| 9 | 0.275 | 133 | 30 |
| 10 | 0.05 | 190 | 30 |
| 11 | 0.5 | 190 | 30 |

Figure 1:
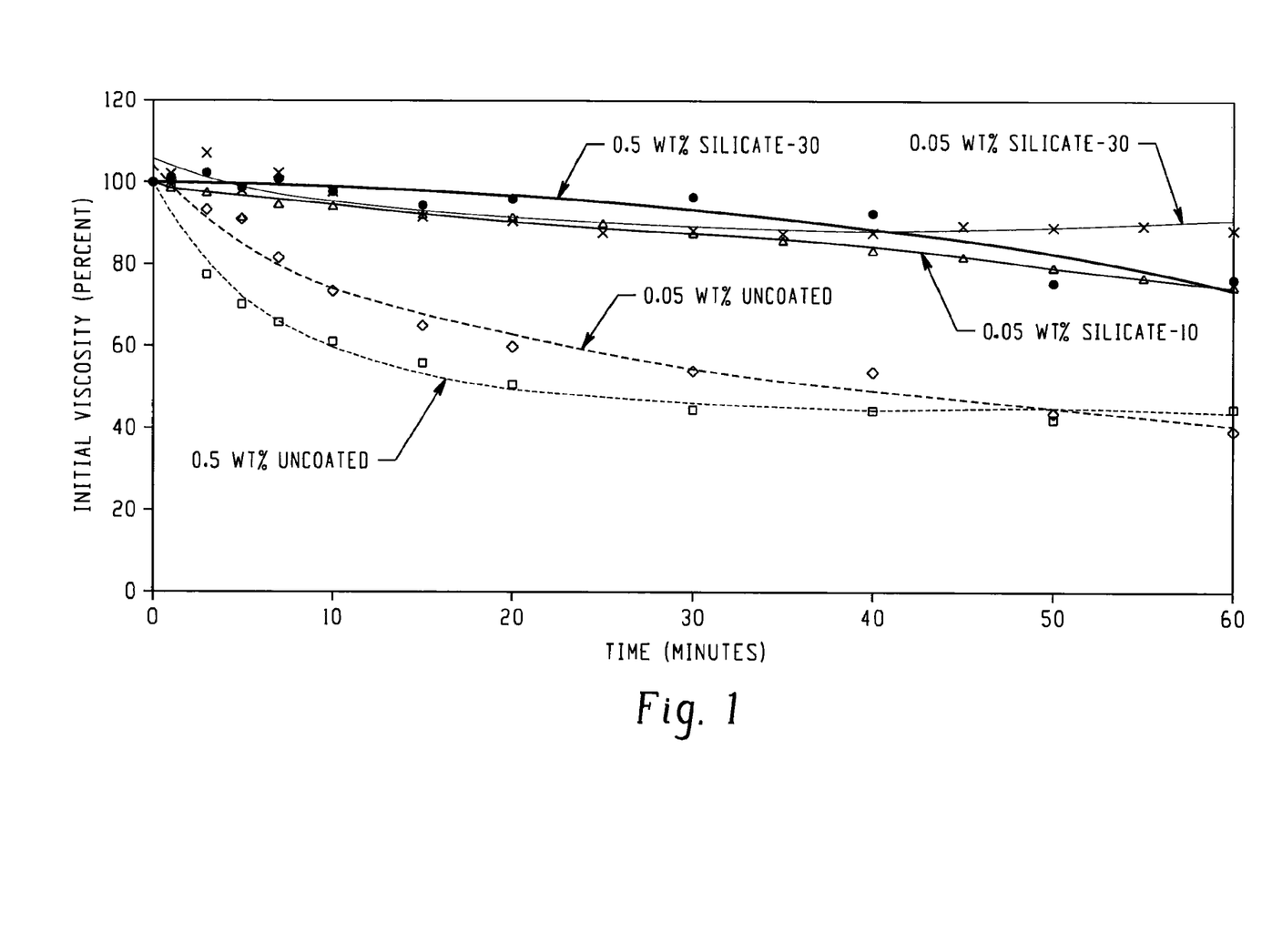
FIG. 1 graphically illustrates fluid viscosity at 75° F. as a function of time for various silicate coated and uncoated sodium percarbonate granules, wherein the fluid included crosslinked guar.
Figure 2:
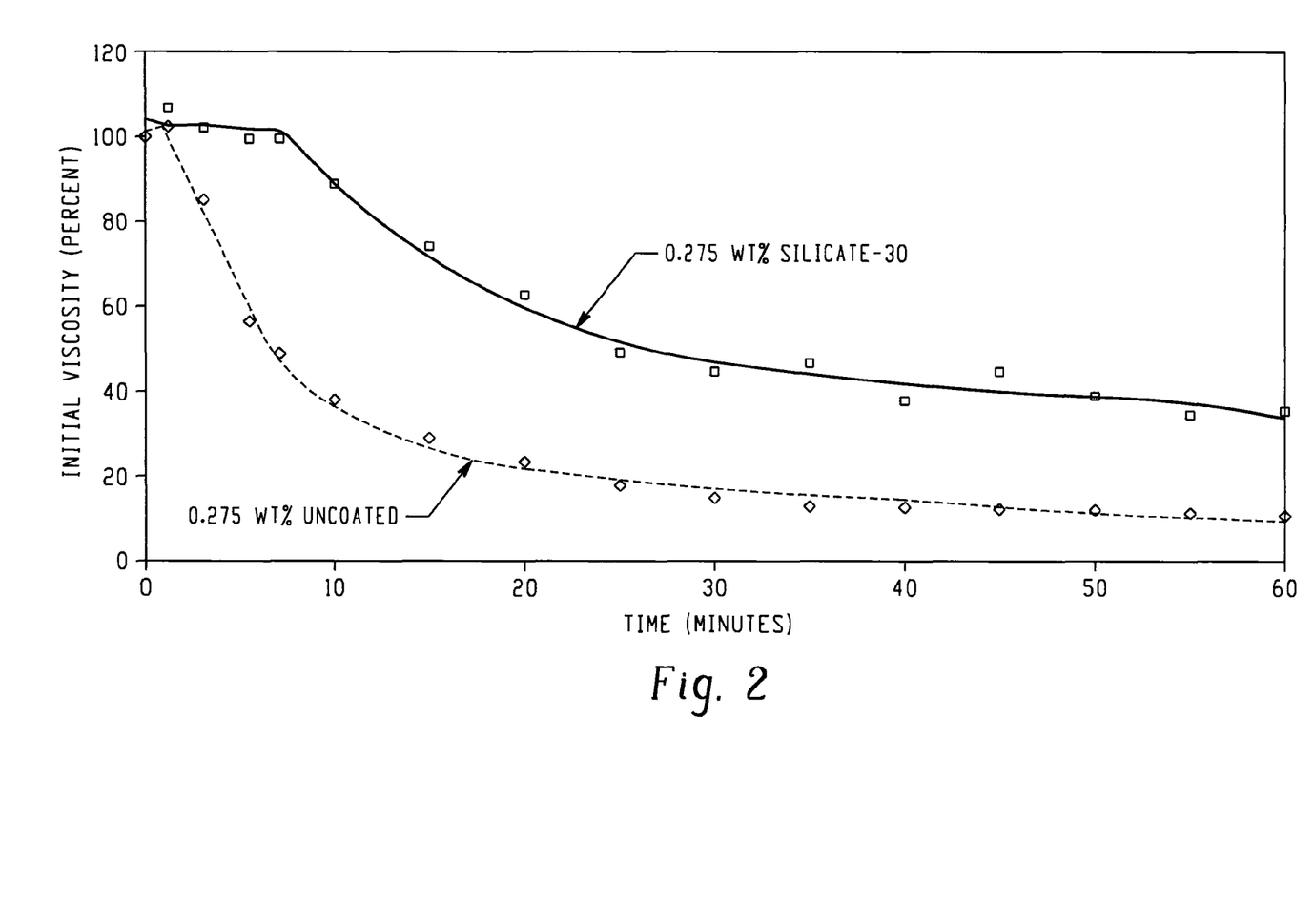
FIG. 2 graphically illustrates viscosity at 133° F. as a function of time comparing silicate coated sodium percarbonate granules and uncoated sodium percarbonate granules, wherein the fluid included crosslinked guar.
Figure 3:
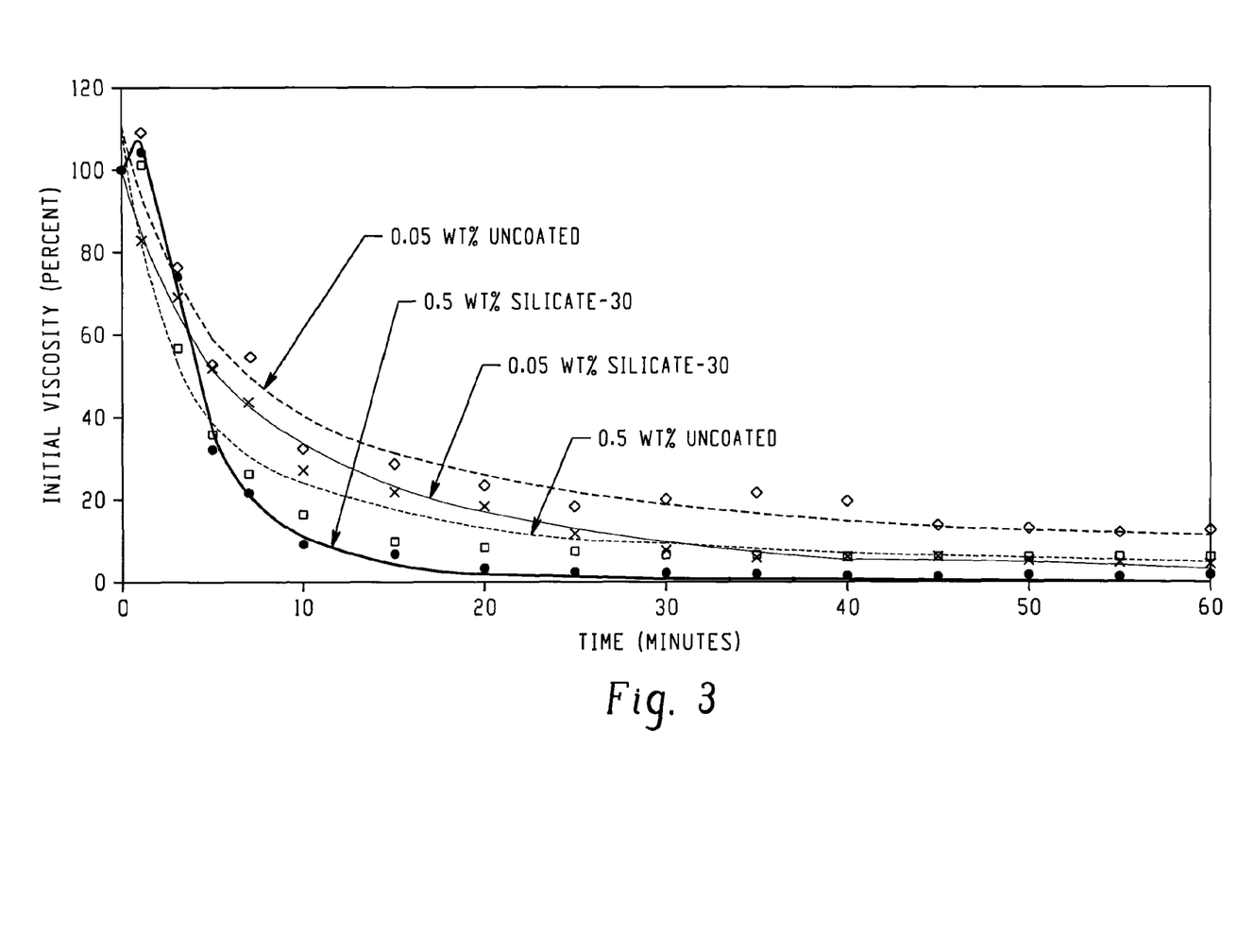
FIG. 3 graphically illustrates fluid viscosity at 190° F. as a function of time for various concentrations of silicate coated sodium percarbonate granules and uncoated sodium percarbonate granules, wherein the fluid included crosslinked guar.

FIGS. 1-3 graphically illustrate viscosity as a function of time with all of the data for the above samples normalized as a percentage of initial viscosity. The room-temperature data as presented in FIG. 1 shows that both silicate-coated samples provided excellent stability relative to uncoated sodium percarbonate monitored at the same temperature. The 30 wt % sodium silicate-coated sodium percarbonate granules exhibited less release as a function of time than did the 10% sodium silicate-coated sodium percarbonate granules. At higher temperatures, however, the percarbonate released more rapidly into the gel as evidenced by the quicker reduction in viscosity and, when evaluated at 190° F., there is little difference between coated and uncoated samples.

Example 3

In this example, guar polymer degradation in the absence of shear was studied for various coated and uncoated sodium percarbonate granules. In a 2-L vessel, 1,500.0 g deionized water was added to 15.0 g Aqualon Galactasol 651 guar polymer and stirred for 30 minutes at 3000 rpm to form a stock solution of the guar polymer. The guar polymer was not crosslinked. A 300.0 g portion of the stock solution was poured into a 400-mL vessel. Half of this (150.0 mL) was poured into a pressurizable aging cell commercially available by Fann Instrument Company and various amounts of coated and uncoated sodium percarbonate were added as shown in Table 3. The remaining guar polymer solution (150.0 mL) was added to the cell, which was then sealed and pressurized. The aging cell was shaken three times to disperse the sodium percarbonate granules and placed in an oven for a period of time as defined in Table 4. Afterward, viscosity was measured at 3.77 s$^{-1}$ at 75° F. on a Grace M3500a viscometer equipped with an R1 rotor and a B2 bob. The temperatures and pressures used were chosen to simulate depths varying between 500 and 2500 feet, and the time was varied between 4 and 28 hours. The temperature and pressures used to simulate different oil well depths are provided in Table 3, while Table 4 provides the experimental conditions and results for each sample.

TABLE 3

| DEPTH (ft) | TEMP. (° F.) | PRESSURE (psi) |
|---|---|---|
| 500 | 82 | 250 |
| 2,500 | 113 | 1,250 |

TABLE 4

| | CONCENTRATION (wt % sodium percarbonate actives) | DEPTH (ft) | TIME (h) | Na$_2$SiO$_3$ (wt %) | VISCOSITY at 3.77 s$^{-1}$ (cP ± 80 cP) |
|---|---|---|---|---|---|
| 1 | 0.05 | 500 | 4 | Uncoated | 4395 |
| 2 | 0.5 | 500 | 4 | Uncoated | 2996 |
| 3 | 0.05 | 500 | 28 | Uncoated | 3271 |
| 4 | 0.5 | 500 | 28 | Uncoated | 859 |
| 5 | 0.05 | 2,500 | 4 | Uncoated | 3291 |
| 6 | 0.5 | 2,500 | 4 | Uncoated | 1521 |
| 7 | 0.05 | 2,500 | 28 | Uncoated | 1576 |
| 8 | 0.5 | 2,500 | 28 | Uncoated | 920 |
| 9 | 0.05 | 500 | 4 | 30 | 5304 |
| 10 | 0.5 | 500 | 4 | 30 | 4827 |
| 11 | 0.05 | 500 | 28 | 30 | 3835 |
| 12 | 0.5 | 500 | 28 | 30 | 2630 |
| 13 | 0.05 | 2,500 | 4 | 30 | 3375 |
| 14 | 0.5 | 2,500 | 4 | 30 | 2956 |
| 15 | 0.05 | 2,500 | 28 | 30 | 1967 |
| 16 | 0.5 | 2,500 | 28 | 30 | 947 |

The results indicate that the 30 wt % sodium silicate-coated sodium percarbonate had an interesting profile for degrading the guar. At shallow depths and shorter times, the coated sodium silicate coated percarbonate showed much slower degradation than the uncoated sodium percarbonate, but at deeper conditions and longer times it degrades guar as well as uncoated sodium percarbonate. The greater speed of guar degradation results from the increased rate of sodium percarbonate decomposition at elevated temperatures. This causes pressure to rapidly rise inside the coating, eventually cracking it from the inside and allowing sodium percarbonate to escape into the guar before the coating is dissolved. However, the temperature of the guar only slowly rises from the surface temperature as it is pumped down hole and subsequently heated at the bottom of a well.

Example 4

In this example, the following breakers were evaluated in a 4 pounds per 1000 gallons polymer solution (lb/Mgal) at 75° F.: a control without breaker; uncoated sodium percarbonate; sodium percarbonate coated with 22 wt % sodium silicate; and sodium percarbonate coated with 28 wt % sodium silicate were evaluated.

The polymer solution was prepared by adding 0.441 grams (g) of an ultrahigh molecular weight copolymer of acrylic acid and acrylamide commercially available under the trade name Callaway A-4330 to 1000 g of deionized water. The solution was mixed for 30 minutes at 600 rpm. The polymer solution (175 g) was poured into a sample cup and placed under a Grace 3500 viscometer equipped with an R1 rotor and B1 bob. The rotor began shearing the fluid at 100 s$^{-1}$ and the breaker (0.012±0.004 g) was immediately added. Viscosity was measured as a function of time for 90 minutes.

Figure 4:
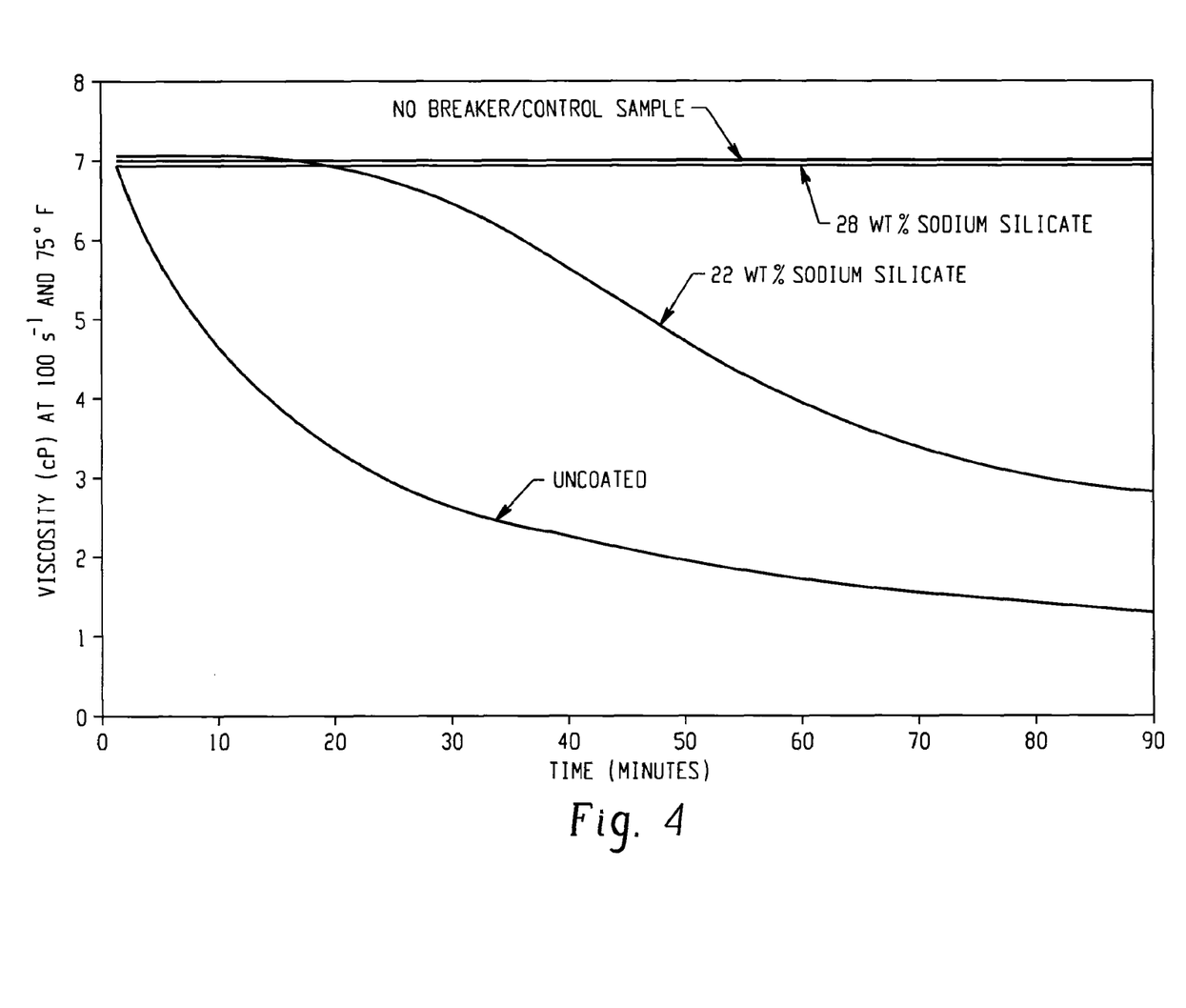
FIG. 4 graphically illustrates fluid viscosity at 75° F. as a function of time for silicate coated sodium percarbonate granules and uncoated sodium percarbonate granules, wherein the fluid included a copolymer of acrylic acid and acrylamide.

The results for these experiments are shown in FIG. 4. The viscosity of the control sample remains constant over the test time, as does that of the fluid treated with the sodium percarbonate that had been coated with a 28 wt % sodium silicate coating. The production sodium percarbonate sample with a 22 wt % coating exhibited no release for the first 20 minutes, and then slowly degraded the polymer as evidenced by the viscosity reduction. The uncoated SPC, however, reacted quickly and immediately degraded the polymer solution. Thus the presence of the sodium silicate coating was effective to delay release of the sodium percarbonate. Furthermore, thicker coatings appear to correlate with slower releases of sodium percarbonate into the fluid.

Example 5

In this example, the following breakers were evaluated in a 40 pounds per 1000 gallons (lb/Mgal) linear guar gel solution at 120° F.: a control without breaker; uncoated sodium percarbonate; sodium percarbonate coated with 22 wt % sodium silicate; and sodium percarbonate coated with 28 wt % sodium silicate were evaluated.

The linear guar gel was prepared using a Waring blender attached to a rheostat set to 55%. Deionized water (800.0 g) was added to the blender, and then the blender was run on low speed. Next, guar (3.841 g) commercially available under trade name HR71-51D from Benchmark Performance Group was added while the blender was stirring and the solution was blended on low speed for 30 minutes. Finally, the solution was allowed to rest for 30 minutes in the absence of shear.

The tests were performed on a Grace 3500 viscometer equipped with an R1 rotor and B1 bob. For a test, a portion (175.0 g) of the guar solution was poured into the sample cup, which was placed under the viscometer. The breaker (0.104±0.003 g) was added, and then the rotor began shearing the sample at 511 s$^{-1}$ while the temperature ramped to 120° F. For each sample, the viscosity was measured as a function of time for 90 minutes.

Figure 5:
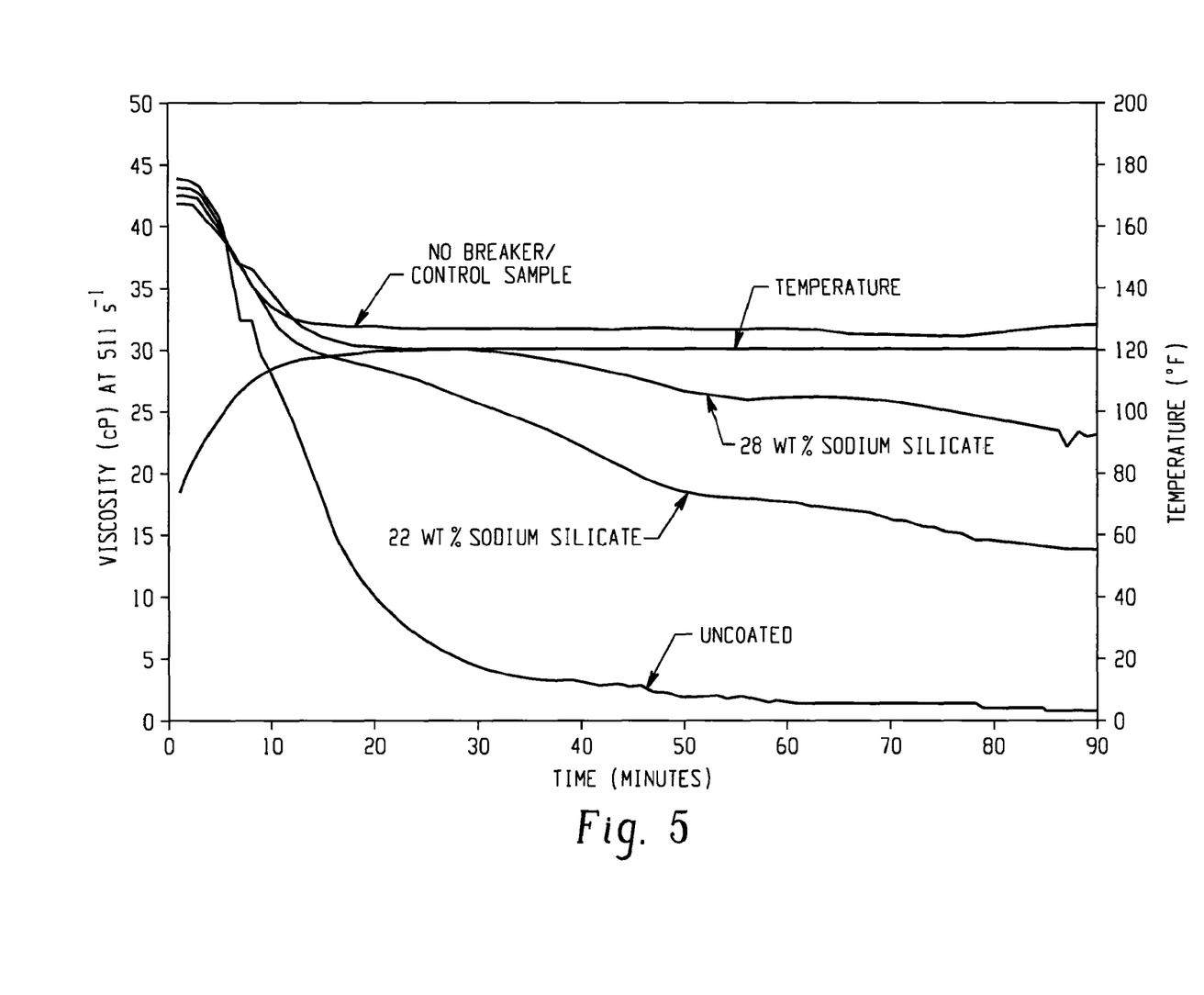
FIG. 5 graphically illustrates fluid viscosity at 120° F. as a function of time for silicate coated sodium percarbonate granules and uncoated sodium percarbonate granules, wherein the fluid included a linear (uncrosslinked) guar gel.

FIG. 5 illustrates the results. The uncoated sodium percarbonate causes an immediate and rapid drop in the viscosity of the guar, while the two coated samples degrade the viscosity more slowly. Furthermore, the sample with 28 wt % sodium silicate coating degrades the guar more slowly than the production sample with the 22 wt % sodium silicate coating. The time release coating significantly slows the degradation of the linear guar gels relative to the degradation caused by uncoated sodium percarbonate. Furthermore, thicker coatings appear to correlate with slower releases of sodium percarbonate into the fluid.

Example 6

In this example, the following breakers were evaluated in 40 pounds per 1000 gallons (lb/Mgal) boron crosslinked linear guar gel solution at 150° F.: a control without breaker; uncoated sodium percarbonate; sodium percarbonate coated with 22 wt % sodium silicate; and sodium percarbonate coated with 28 wt % sodium silicate were evaluated.

The boron crosslinked guar gel was prepared using a Waring blender attached to a rheostat set to 55%. Deionized water (800.0 g) was added to the blender, and then the blender was run on low speed. Next, guar (3.8425 g) commercially available under the trade name HR71-51D from Benchmark Performance Group was added while the blender was stirring and the solution was blended on low speed for 30 minutes. Next, a buffer (0.5 mL) commercially available under the trade name S-166 and a boron crosslinker (2.4 mL) commercially available under the trade name BX-1 from Benchmark Performance Group were added and the blender was run for 1 minute. The solution was then allowed to rest for 30 minutes in the absence of shear.

Figure 6:
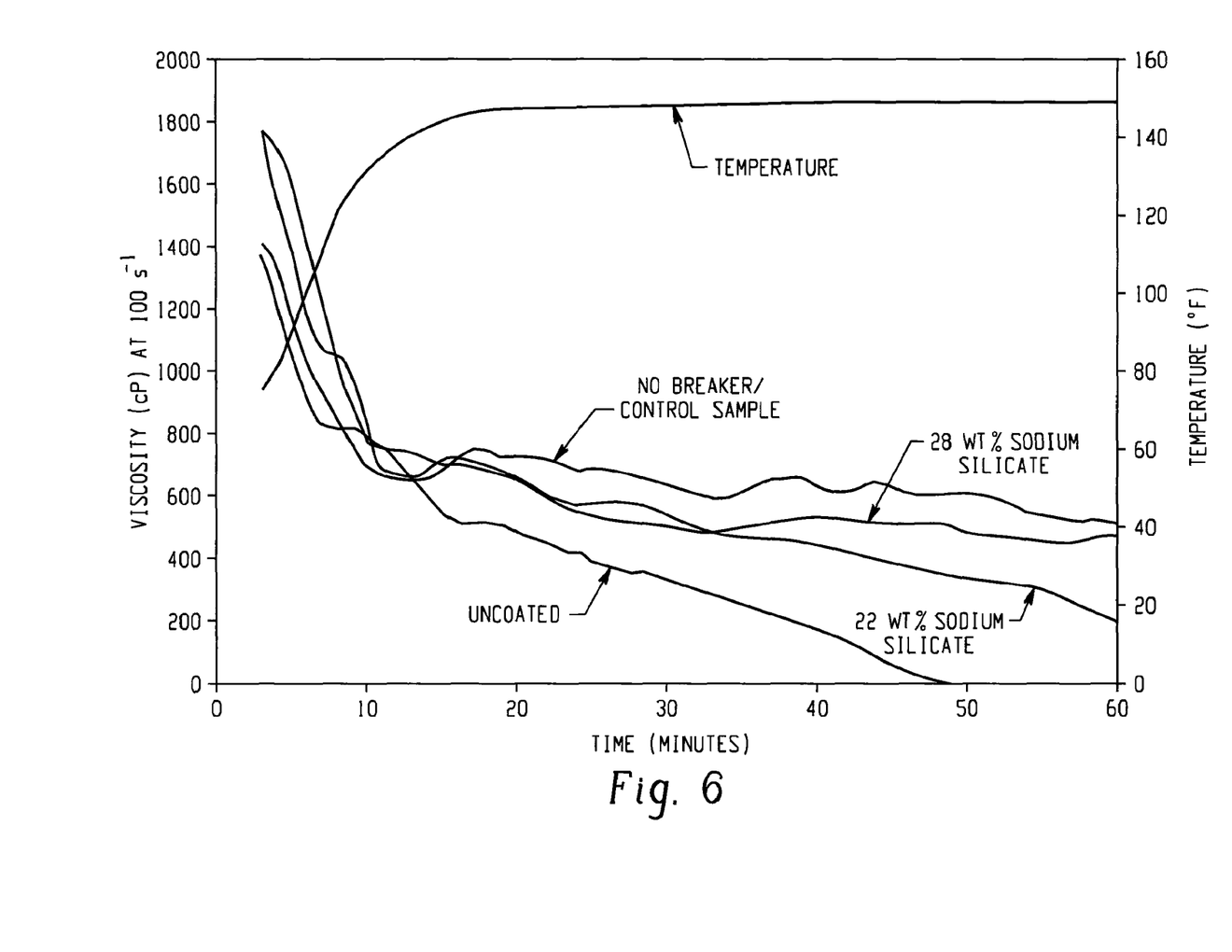
FIG. 6 graphically illustrates fluid viscosity at 150° F. as a function of time for silicate coated sodium percarbonate granules and uncoated sodium percarbonate granules, wherein the fluid included a boron crosslinked guar gel.

The tests were conducted on a Grace 5600 viscometer equipped with an R1 rotor and B5 bob. For each test, a portion (31.7±1.6 g) of the crosslinked guar solution was poured into the sample cup, which was placed under the viscometer, and then the rotor began shearing the sample at 100 s$^{-1}$ while the temperature ramped to 150° F. For each sample, the viscosity was measured as a function of time for 60 minutes. The results are shown in FIG. 6.

As shown, the uncoated sodium percarbonate rapidly degraded the viscosity, and caused a total break after 48 minutes. The sodium percarbonate with the 28 wt % sodium silicate coating caused a small decrease in the viscosity after 60 minutes, while the production 22 wt % sodium silicate coating resulted in a slightly larger drop in the crosslinked gel's viscosity over the testing period. Thus, encapsulating the sodium percarbonate with sodium silicate has been shown to slow the rate of viscosity loss.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A well treatment fluid, comprising:
   water;
   at least one hydratable polymer; and
   sodium percarbonate granules having a delayed release coating wherein the delayed release coating comprises a blend of poly(styrene acrylate) and poly(butyl acrylate).

2. The well treatment fluid of claim 1, wherein the at least one hydratable polymer comprises a polysaccharide, a polyacrylamide, a polyvinylalcohol, and mixtures thereof.

3. The well treatment fluid of claim 1, further comprising a crosslinker, wherein the crosslinker comprises a titanate, a borate, a zirconium-containing compound, a dialdehyde, and mixtures thereof.

4. The well treatment fluid of claim 1, wherein the fluid has a pH from 5 to 12.

5. The well treatment fluid of claim 1, wherein the sodium percarbonate granules having a delayed release coating are configured to provide a dissolution time at up to about 3 hours at a neutral pH at about room temperature.

6. The well treatment fluid of claim 1, further comprising a proppant.

7. The well treatment fluid of claim 1, wherein the at least one hydratable polymer comprises polyacrylamide.

8. The well treatment fluid of claim 1, further comprising a crosslinker, wherein the crosslinker comprises a dialdehyde.

* * * * *